United States Patent [19]

Dorland

[11] 3,928,717

[45] Dec. 23, 1975

[54] APPARATUS FOR PROVIDING PATTERNS ON TELEVISION RECEIVER SCREENS

[76] Inventor: Lee A. Dorland, 812 S. Dodge, Iowa City, Iowa 52240

[22] Filed: July 17, 1974

[21] Appl. No.: 489,360

[52] U.S. Cl. .................. 178/6; 84/464; 178/DIG. 6; 179/1.5 P

[51] Int. Cl.[2] .............................................. H04N 5/72

[58] Field of Search ......... 179/1.5 P; 358/82; 178/6, 178/DIG. 6; 240/2 L; 84/464

[56] References Cited

UNITED STATES PATENTS

| | | | |
|---|---|---|---|
| 2,704,816 | 3/1955 | Fernsler | 178/DIG. 6 |
| 3,723,652 | 3/1973 | Alles et al. | 179/1.5 P |

OTHER PUBLICATIONS

Johnson et al. Practical Television Servicing, Murray Hill Books, Inc., New York, 1949, p. 267.

*Primary Examiner*—George H. Libman
*Attorney, Agent, or Firm*—Brumbaugh, Graves, Donohue & Raymond

[57] ABSTRACT

A method and apparatus for providing pleasing patterns on television receiver screens is presented which entails aiming a TV camera at a TV monitor or receiver to provide a feedback loop. An audio signal is used to provide distortion by detuning a video signal or altering the amount of light in the system. Additional variations in the pleasing patterns present on the TV screen can be obtained by inserting slides or objects between the camera and the screen.

1 Claim, 2 Drawing Figures

APPARATUS FOR PROVIDING PATTERNS ON TELEVISION RECEIVER SCREENS

BACKGROUND OF THE INVENTION

The present invention relates to a method and apparatus for forming pleasing patterns on TV screens, and more particularly relates to a method and apparatus for forming such pleasing patterns which are related to an audio signal input to the system.

In the past it has been known that if a TV camera feeding a signal to a TV monitor or receiver is focused on the monitor, a feedback loop will be formed. This loop will provide interesting patterns on the TV screen. The visual use of feedback in this manner is somewhat analogous to the audio feedback present when a microphone connected to an amplifier is held close to a speaker driven by the amplifier. Instead of a squeal, however, as with the microphone-speaker feedback, a pleasing pattern is formed on the TV monitor screen.

Heretofore, audio signals have been related to visual displays by electronic "color organs" which display different colored lights at different intensities, the colors and intensities related to the frequencies and intensities of an audio signal injected into the input of such color organs. The present invention has as its purpose the provision of interesting, varied patterns related to an audio signal present at the input of the apparatus, these patterns capable of being viewed on a television receiver.

SUMMARY OF THE INVENTION

An apparatus for producing pleasing images on a kinescope screen comprises a video feedback loop having a kinescope with a viewing screen and associated electronics capable of producing a raster thereon. A TV camera which produces an electronic signal representative of an optical scene is aimed at the screen of the kinescope. The output of the TV camera is fed to a tuner where it is altered in frequency, and the resulting signal is connected to the kinescope to produce a pattern thereon. Preferably, the alteration of the electronic signal of the TV camera is related to the intensity of an audio source to the tuner which is connected between the output of the TV camera and the kinescope input.

The method of forming pleasing patterns on a kinescope screen comprises creating an electronic signal representative of the optical information on a kinescope screen and then distorting the frequency of the electronic signal by means of an audio signal whose intensity determines the amount of distortion imparted onto the electronic signal. The distorted electronic signal is then presented to the input of a kinescope.

DETAILED DESCRIPTION OF THE INVENTION

Figure 1:
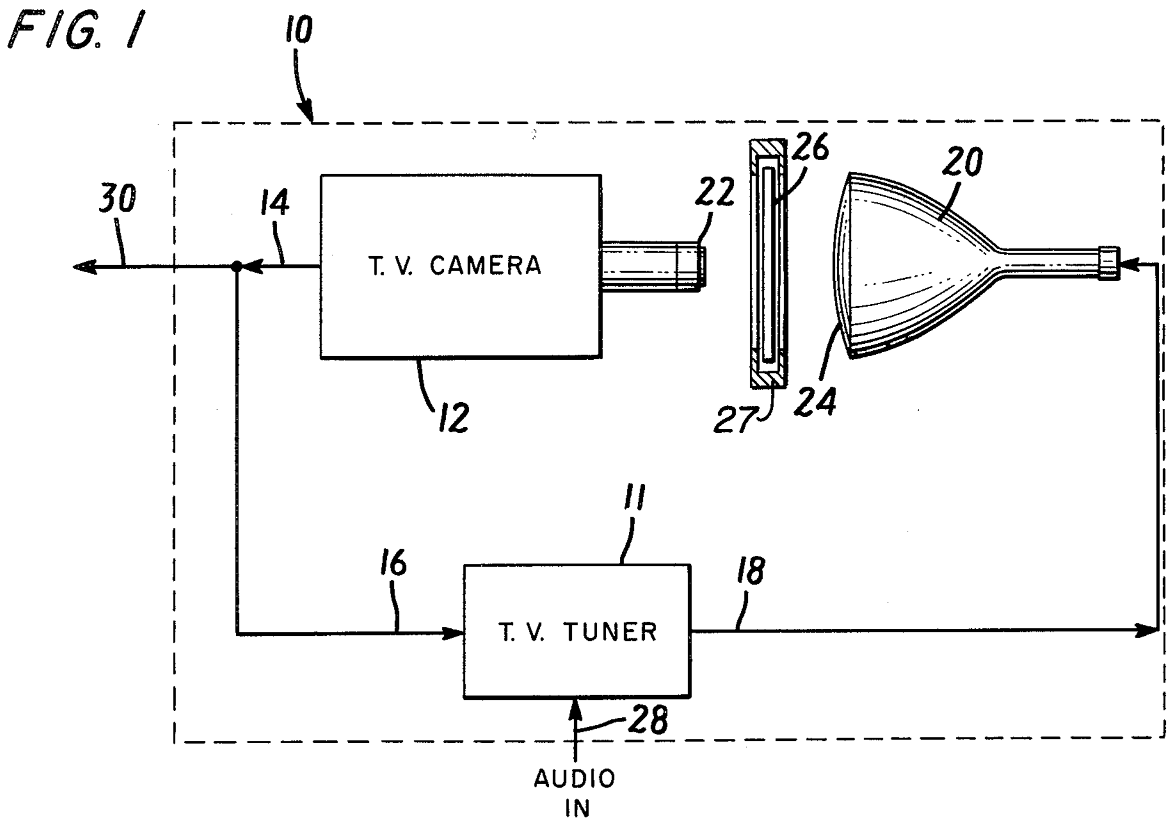
FIG. 1 is a schematic representation of one embodiment of the present invention.

Referring generally to FIG. 1, a TV camera 12 is shown connected in a pattern generator system 10 of the present invention. In particular, an output 14 of the TV camera 12 is connected to an input 16 of a pattern generator or audio controlled TV tuner 11 as well as to an output 30 of the system 10. An output 18 of the tuner 11 is shown to be connected to a kinescope 20 which may be either a color or a black-and-white kinescope. The other electronics used to power and to produce the raster on the kinescope 20 are not shown in FIG. 1 but are of the type generally used in the TV art. The lens 22 of the TV camera 12 is aimed at the screen 24 of the kinescope 20. Inserted between the lens 22 and the screen 24 is a slide 26 positioned in a suitable location by a holder, 27. The slide 26 may be used, or omitted, as desired.

The system 10 includes an audio input 28 at which an audio signal is coupled to the audio controlled tuner 11. The output 18 of the tuner 11 controls the intensity of the scanned beam on the screen 24 of the kinescope 20. The audio signal detunes the tuner 11 in any suitable manner which tends to distort the output 18. Increasing the amplitude of the audio signal causes greater detuning and increased patterning. For example, this may be accomplished electronically or mechanically as desired. This phenomenon of distortion is the same that may be observed when the fine tuning of a TV receiver is used to detune the tuner from a particular channel. The particular apparatus used to provide distortion will be referred to herein by the term "pattern generator".

The addition of the slide 26 between the lens 22 of the TV camera 12 and the screen 24 of the kinescope 20 allows for further variation of the pleasing pattern present on the screen 24 of the kinescope 20. The pattern on the slide 26 through which the camera 12 is aimed will be included in the signal generated by the TV camera 12. Thus, the signal present at the input 16 of the tuner 11 will be composed of the image present on the screen 24 as altered by the slide 26. The signal from the TV camera 12 will be distorted by the presence of audio on the input 28 which detunes the tuner 11. Thus, the output signal 18 of the tuner 11 which provides a pattern on the kinescope 20 will be a composite signal determined by the audio input to the tuner 11 and the image on the slide 26, and the image may be varied by varying either the audio signal or the slide 26 or both. The simplest way of varying the intensity of the audio signal is by connecting the input 28 of the pattern generator 10 to a music source.

The signal derived at the output 30 of the pattern generator 10 is fed directly to an antenna connection of a TV receiver (not shown) tuned to the channel represented by the carrier frequency of the TV camera 12 or the signal may be fed to a TV transmitter for transmission. It should be recognized that the tuner 11, which is detuned by the audio signal at the input 28 of the system 10, presents its detuned signal solely to the kinescope 20 internal to the pattern generator 10.

while the output 30 of the system 10 of FIG. 1 has been shown connected to the output 14 of the TV camera 12, as will be obvious to one skilled in the art, the output of the tuner 11 may also be used as the output of the system 10 without departing from the present invention.

Figure 2:
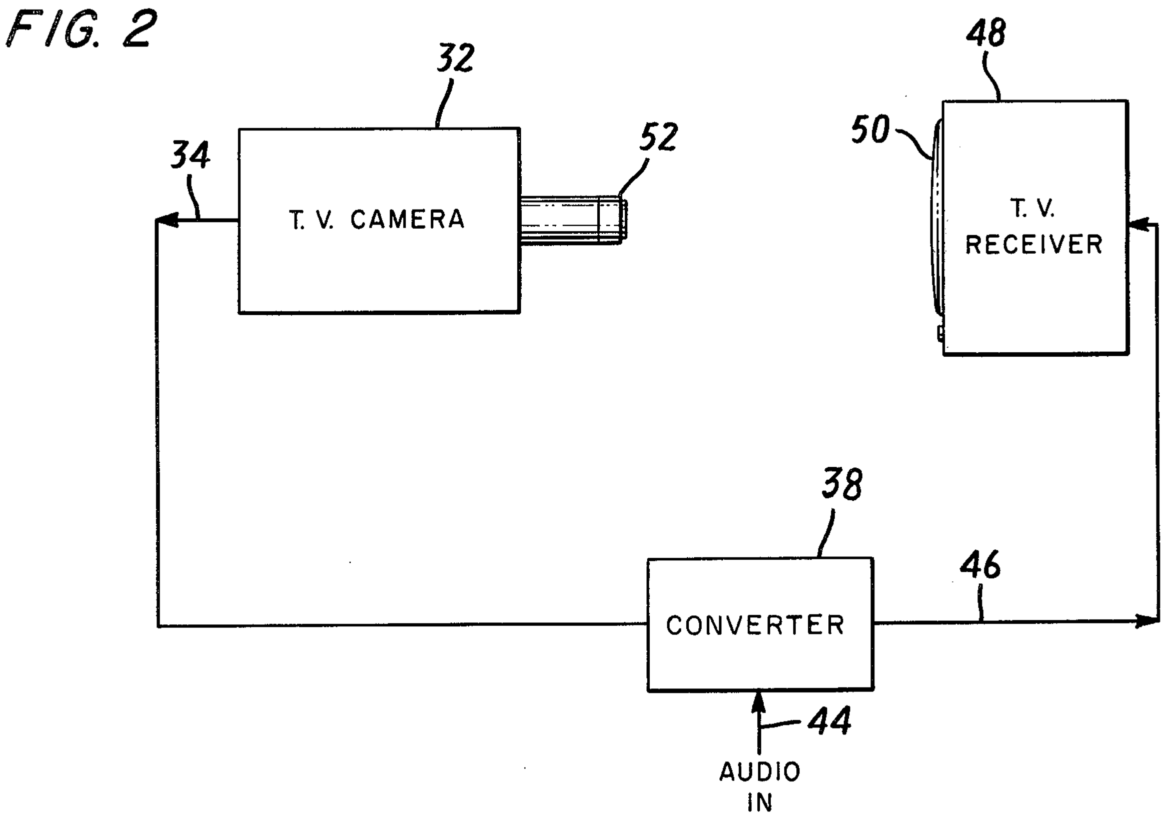
FIG. 2 is a schematic representation of another embodiment of the present invention.

Referring to FIG. 2, a second embodiment of the invention is shown in which a home TV receiver 48 is substituted for the internal kinescope 20 of the embodiment 10 of FIG. 1. A TV camera 22 provides video signals on a suitable frequency at its output 34. This may be either a video signal to a monitor or an RF signal to a TV receiver. The pattern generator or converter 38 frequency modulates and thereby detunes the signals of the TV camera 32. The converter 38 functions to shift the frequency of the signals in accordance with the amplitude of the audio signals suppled to an audio input 44. Thus, assuming the carrier frequency of Channel 4 has been selected for use with a TV receiver, with no audio on the input 44, the signals on the converter 38 output 46 fed to the antenna input of the TV receiver 48 will be at the carrier frequency of Channel 4. Supplying audio signals from, for example, a music source, such as a phonograph record, will cause the frequency of the signals on the output 46 to vary from the Channel 4 frequency, thereby providing a distorted pattern on the screen 50 of the receiver 48. A lens 52 of the TV camera 32, aimed at the TV receiver, picks up the pattern to provide a feedback arrangement for generating pleasing patterns. With this arrangement, the screen 50 ordinarily used for viewing may provide, when desired, pleasing patterns.

Objects may also be interposed between the lens 52 and the viewing screen 50 of the receiver 48, for example, filters, people, lights, to provide a great variety of pleasing patterns, all changing in accordance with the intensity of audio signals which, at the same time, may be propagated to occupants of the room through loud speaker systems.

An inexpensive TV camera 32 may be provided by using a vidicon tube with either a partially defective target or face plate inasmuch as great fidelity of reproduction is not required but, rather, distortion is encouraged to increase the pleasing patterns generated.

A suitable manner of making an audio controlled tuner 11 would be to provide a varactor diode as a capacitive element in a tuned circuit which is tuned to the carrier frequency of the TV camera 12. An audio input signal is rectified and the DC voltage thereby obtained is applied to alter the bias on the varacter diode, thereby changing its capacitance and detuning the tuned circuit.

Similarly, a converter 38 may be constructed capable of modulating an RF input and shifting it in frequency over a relatively small range. The amplitude of an audio signal provided to the converter 38 is used to determine the amount of frequency shift. Frequency modulators of this type are well known, so further description will not be necessary for one skilled in the art.

One alternative embodiment of the present invention uses a variable brightness or contrast control either of which may be varied by the intensity of an audio signal. In such an embodiment, the frequency of the signal sent to the television receiver would be set at a constant value chosen to provide a detuned input. The constant detuned frequency to which the receiver is subjected would provide a pattern on the TV screen.

Another embodiment of the present invention utilizes a color TV camera and a color receiver. A filter network attached to the audio input of the system separates the audio input frequencies into low, middle, and high frequency ranges. Each frequency range is then used to control the intensity of one of the colors projected onto the receiver screen by varying the signal voltage on the electron gun associated with that color. A TV camera modified to provide color signals based upon a variable bias provided by an audio input network of the type described may be also used.

Yet another embodiment of the invention uses a black-and-white TV camera whose output signal frequency varies in accordance with the intensity of audio information present at an audio input to the device on the manner heretofore described. The output signal of the device feeds into a color generating system of the type known commercially as "Colorizers" or "Quantizers". A Colorizer or a Quantizer is a system which translates black-and-white information into color information based upon the intensity of the signal present. Abrupt color changes are possible with small intensity changes by these devices. In this embodiment, a color receiver is used.

It should be realized and understood by one skilled in the art that the patterns produced by any of the embodiments heretofore described will be enhanced by the utilization of a camera which may be rotated relative to the receiver screen at which it is aimed. In addition, such features as reverse scan, black-and-white reversal, and a variable focus or zoom lens can be used to enhance the pattern generation of the systems described above.

It has been observed that sharp focusing of the camera on the screen is not required to obtain pattern generation. In fact, softer patterns can be generated by an unfocused TV camera than by a highly focused TV camera. It has also been noted that the relationship between large f-stops and narrow depth-of-field and small f-stops and a wide depth-of-field can be successfully employed in creating interesting patterns.

I claim:

1. An apparatus for producing pleasing images on a TV receiver comprising:

a. a TV camera having a lens, said TV camera capable of producing an electronic signal representative of an optical scene;

b. a pattern generator which varies the frequency of said electronic signal in response to an audio signal present at an audio input of said pattern generator, said pattern generator comprising an audio controlled TV tuner having an input for an audio signal and including means for varying said electronic signal in frequency, with the amount of said variation being determined by the intensity of the audio signal;

c. means for connecting said pattern generator to a kinescope, the screen of which said lens is aimed at to form a feedback loop;

d. a slide holder interposed between said lens and said screen, said slide holder being spaced adjacent to said screen, whereby the planes of said screen and of said slide holder are both substantially in focus of said lens at the same time;

e. a slide in said slide holder, the image on said slide altering said feedback loop;

f. output means for connecting an external TV receiver to an output of said TV camera; and g. an external TV receiver connected to said output means for viewing said pleasing images.

* * * * *